United States Patent
Sharma et al.

(10) Patent No.: US 12,443,998 B2
(45) Date of Patent: Oct. 14, 2025

(54) GENERATING PERFORMANCE COMPOSITES

(71) Applicant: JPMorgan Chase Bank, N.A., New York, NY (US)

(72) Inventors: Shanti Sharma, McKinney, TX (US); Shahriar Taj, New York, NY (US); Glyn Welch, Ascot (GB); Fatih Onalan, Vetraz-Monthoux (FR); Brandon Davin, Brooklyn, NY (US); Sujit Kumar, Bengaluru (IN); Hamza Alwani, Euless, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 164 days.

(21) Appl. No.: 18/196,973

(22) Filed: May 12, 2023

(65) Prior Publication Data

US 2024/0378672 A1  Nov. 14, 2024

(51) Int. Cl.
*G06Q 40/06* (2012.01)
(52) U.S. Cl.
CPC ................... *G06Q 40/06* (2013.01)
(58) Field of Classification Search
CPC .................................................. G06Q 40/06
See application file for complete search history.

(56) References Cited

U.S. PATENT DOCUMENTS

| | | | |
|---|---|---|---|
| 7,383,219 B1* | 6/2008 | Jennings | G06Q 40/00 705/36 R |
| 2008/0228666 A1* | 9/2008 | Hutcheson | G06Q 40/06 705/36 R |
| 2010/0005034 A1* | 1/2010 | Carpenter | G06Q 40/06 705/36 R |
| 2015/0324919 A1* | 11/2015 | Riggs | G06F 16/287 705/36 R |
| 2021/0110478 A1* | 4/2021 | Shannon | G06F 16/904 |

* cited by examiner

*Primary Examiner* — Scott S Trotter
(74) *Attorney, Agent, or Firm* — Greenblum & Bernstein, P.L.C.

(57) ABSTRACT

In one implementation, a system for generating composites performance is disclosed. The system may access designated-value account information associated with designated-value accounts, each with a respective rate of return. The system parses the designated-value account information into sets of strategy-based designated-value accounts. The system may concurrently parse with a first processor, a first set of strategy-based designated-value accounts and with a second processor, a second set of strategy-based designated-value accounts by applying logical rulesets to determine membership eligibility in the sets of strategy-based designated-value accounts. The system may generate composites performance by applying statistical analysis to the sets of strategy-based designated-value accounts based on the respective rate of return of each included designated-value account. The system may output the composites performance to indicate performance of the sets of strategy-based designated-value accounts.

19 Claims, 7 Drawing Sheets

COMPUTER READABLE STORAGE MEDIUM

ACCESS, OVER A NETWORK VIA THE NETWORK COMMUNICATION INTERFACE, DESIGNATED-VALUE ACCOUNT INFORMATION, WHEREIN THE DESIGNATED-VALUE ACCOUNT INFORMATION IS ACCOUNT INFORMATION ASSOCIATED WITH A PLURALITY OF DESIGNATED-VALUE ACCOUNTS THAT HAVE A RESPECTIVE RATE OF RETURN, EACH RESPECTIVE RATE OF RETURN BEING BASED ON ONE OR MORE ACCOUNT MANAGER TRANSACTIONS FOR THE DESIGNATED-VALUE ACCOUNTS 602

PARSE THE DESIGNATED-VALUE ACCOUNT INFORMATION INTO A PLURALITY OF SETS OF STRATEGY-BASED DESIGNATED-VALUE ACCOUNTS INCLUDING A FIRST SET OF STRATEGY-BASED DESIGNATED-VALUE ACCOUNTS AND A SECOND SET OF STRATEGY-BASED DESIGNATED-VALUE ACCOUNTS 604

CONCURRENTLY PARSE BY A FIRST PROCESSOR, THE FIRST SET OF STRATEGY-BASED DESIGNATED-VALUE ACCOUNTS AND BY A SECOND PROCESSOR, THE SECOND SET OF STRATEGY-BASED DESIGNATED-VALUE ACCOUNTS BY APPLYING A PLURALITY OF LOGICAL RULESETS DETERMINING MEMBERSHIP ELIGIBILITY IN THE FIRST SET OF STRATEGY-BASED DESIGNATED-VALUE ACCOUNTS AND THE SECOND SET OF STRATEGY-BASED DESIGNATED-VALUE ACCOUNTS 606

FOR EACH ONE OF THE FIRST SET AND THE SECOND SET OF STRATEGY-BASED DESIGNATED-VALUE ACCOUNTS, GENERATE A RESPECTIVE ACCOUNT PERFORMANCE COMPOSITE BY APPLYING STATISTICAL ANALYSIS TO THE FIRST SET AND THE SECOND SET OF STRATEGY-BASED DESIGNATED-VALUE ACCOUNTS BASED ON THE RESPECTIVE RATE OF RETURN FOR EACH DESIGNATED-VALUE ACCOUNT 608

OUTPUT, VIA AN API (APPLICATION PROGRAMMING INTERFACE), USER INTERFACE OR BATCH PROCESSING, THE RESPECTIVE ACCOUNT PERFORMANCE COMPOSITE TO INDICATE PERFORMANCE OF THE FIRST SET AND THE SECOND SET OF STRATEGY-BASED DESIGNATED-VALUE ACCOUNTS 610

GENERATING PERFORMANCE COMPOSITES

BACKGROUND

Many investors rely on professional asset management firms to manage their assets. Investors may include private individuals, pension funds, corporations, charitable organizations, educational institutions and the like. Assets may include securities such as shares, real estate and other tradeable assets. A professional asset management firm may manage the securities to meet specified investment goals of the investor.

BRIEF DESCRIPTION OF THE DRAWINGS

The drawings illustrate only particular examples of the disclosure and therefore are not to be considered to be limiting of their scope. The principles here are described and explained with additional specificity and detail through the use of the accompanying drawings.

FIG. 6A illustrates example instructions stored on a non-transitory computer-readable storage medium, which can be used in a computer system or device according to one example of the present disclosure.

DETAILED DESCRIPTION

Professional asset managers have witnessed an unprecedented growth in investor accounts. The volume of available investment products is also growing. Hundreds and thousands of investment products are available to millions of investors. Asset managers often present the performance of investment products to active investors and prospective clients. The presentation is subject to high scrutiny by regulators and must meet regulatory regimes as well as adherence to standards. The presentation must also be fair, consistent and comparable over time among firms.

The presentation of the performance of an investment product can be via a composite. A composite is an aggregation of one or more investments accounts managed according to a similar investment mandate. A professional asset manager may wish to present a composite to active investors or prospective clients. Given the regulatory standards and volume of data that must be processed, composite generation is slow and can be delayed for many days or in some cases, for many weeks.

The present disclosure addresses the foregoing by providing a server system, a computer program product and method of generating performance composites. The system is fast, can batch load data within 15 minutes, perform calculations within two minutes and complete composite production within 8 Hours.

In one implementation, the system can access designated-value account information associated with designated-value accounts, i.e., accounts with a minimum threshold value, where each designated-value account has a respective rate of return. The rate of return may be based on transactions, strategy, etc. as implemented by an account manager.

Here, upon accessing the designated-value account information, the system parses the account information into sets of strategy-based designated-value accounts based on a strategy, investment mandate or composite objective. Specifically, the system concurrently parses with a first processor, a first set of strategy-based designated-value accounts and with a second processor, a second set of strategy-based designated-value accounts. The strategy-based designated-value accounts are parsed by applying logical rulesets to determine membership eligibility in the sets of strategy-based designated-value accounts. By concurrently parsing the strategy-based data sets into numerous logical-ruleset-based account datasets, the present disclosure significantly improves data load times and recalculation from many days to as little as 15 minutes.

The system can then generate account performance composites by applying statistical analysis to the sets of strategy-based designated-value accounts. The statistical analysis may be based on the respective rate of return of each designated-value account. The system may then output the account performance composites to indicate performance of the sets of strategy-based designated-value accounts. In an example implementation, the system can generate a machine learning model to explain composite rules which calculates membership and composite performance. The rule explanation may be used to generate and review composites rules and generate reports for auditors.

Figure 1:
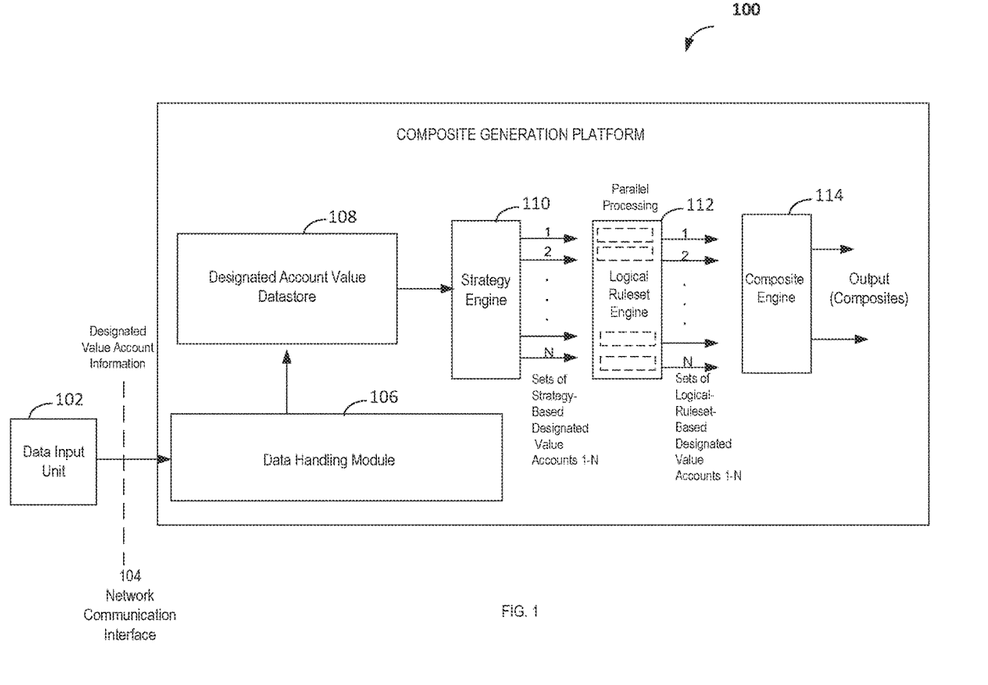
FIG. 1 illustrates a composite generation platform to generate performance composites according to an example of the present disclosure.

FIG. 1 illustrates a composite generation platform 100 to generate performance composites according to an example of the present disclosure.

In FIG. 1, composite generation platform 100 includes a data handling module 106 and a strategy engine 110 communicably coupled via a designated-value account datastore 108. Although not illustrated in FIG. 1, composite generation platform 100 may include additional components consistent with the present disclosure.

The composite generation process is initiated when data handling module 106 receives designated-value account information from a data input unit 102 via a network communication interface 104. The network communication interface 104 may be part of a server system within an enterprising computing system, and designated-value account information from data input unit 102 may be via an API (Application Programming Interface).

As used herein, "designated-value account information" is data associated with a designated-value account. The rate of return showing the periodical performance of a designated-value account is an example of designated-value account information. Another example of designated-value account information is reference data (see FIG. 2) that shows attributes (non-personal) of designated-value accounts. As another example, designated-value information may include benchmark used to benchmark the designated-value accounts.

Further, a "designated-value account" is an investment account composed of securities and other tradeable assets. Such an investment account may be managed by a professional asset manager that can influence the account rate of return by managing and executing investment transactions for the designated-value account, per the investment mandate. As implied by its name, a "designated-value account" has a designated or threshold value above a certain value or amount. For example, a designated-value account may be any account with a threshold value of over USD 1,000,000.00.

Upon receipt of designated-value account information, data handling unit 106 ingests the data and implements standard processing to conform and clean the data for use by composite generation platform 100. The data handling unit 106 may include a data ingestion module, a data quality module and a data preparation module discussed with reference to FIG. 2. The data handling unit 106 may merge all of the designated-value account information, i.e., account reference data, benchmark data and account return data for storage in the designated-value account datastore 108 for access by strategy engine 110.

Strategy engine 110 accesses and parses the designated-value account information. Here, by parsing, it is meant that strategy engine 110 utilizes a program, a routine or instruction that may or may not be part of a compiler to breakup received inputs into constituent parts such as objects, methods and their attributes, identifiable or desired portions of data, etc.

Specifically, strategy engine 110 parses the designated-value account information sets of strategy-based designated-value accounts 1-N (hereinafter "strategy-based accounts" 1 through N) as shown. Each set or information set of strategy-based accounts 1 through N is based on a strategy, investment mandate or objective of the composite to which an investment account or portfolio belongs. Thus, the strategy for the set of strategy-based accounts 1 may be index investing, focusing on a portfolio of assets designed to benchmark and match returns of a market index. As another example, the strategy for the set of strategy-based accounts N may be growth investing, focusing on companies that can grow at an above-average rate.

The strategy engine 110 may process hundreds or even thousands of strategies. In one example, strategies are applied as logical rules Boolean values that can result in a "0" or "1" value after the rule is processed. For example, 700 strategies associated with 1 million designated-value accounts are processed to parse the 1 million designated-value accounts into 700 information sets of strategy-based accounts. In this manner, by parsing the designated-value account information into smaller strategy-based datasets, the present disclosure facilitates faster processing with little or no latency in processing designated-value accounts information.

In FIG. 1, composite generation platform 100 further comprises a logical ruleset engine 112 and a composite engine 114. The logical ruleset engine 112 employs parallel processing, and vector based (to speed up processing) multiple processing capabilities to parse the strategy-based data sets into datasets of logical-ruleset-based accounts information. In one example, a separate, single processor is allocated to parse the strategy-based data sets. By using parallel processing to concurrently parse the strategy-based data sets into numerous logical-ruleset-based account datasets, the present disclosure significantly improves data load times and recalculation from as many as four days to 15 minutes.

Specifically, information for each set of strategy-based accounts 1 through N is parsed into datasets of logical-ruleset-based accounts 1 through N. This information is parsed into the datasets of logical-ruleset-based accounts by applying logical rulesets that determine membership eligibility of each strategy-based account in the set of strategy-based accounts. In other words, the logical rulesets are applied to determine whether a specific strategy-based account is eligible for the composite. If a specific strategy-based account is not eligible from a set of strategy-based accounts, it follows that the resulting set of logical-ruleset-based accounts has fewer accounts compared to the initial set of strategy-based accounts.

As noted above, the information for each set of strategy-based account 1-N is parsed into ruleset-based accounts by applying logical rulesets. An example of a logical ruleset is "if designated-value account has MTM value <$1 mm and/or tenure since inception <1 year=remove from composite eligibility." As another example, "If designated-value account receives cash flow >20% MTM value=remove from composite eligibility." The logical rulesets may relate to portfolio type, asset class, investment use, client type, investment constraints/restrictions, material risks of strategy, leverage, illiquid investments as part of the strategy benchmark, etc. Other examples may relate to timing of inclusion of new accounts/portfolios, tax status, etc.

For each set of ruleset-based accounts, the composite engine 114 generates a corresponding composite performance. The composite performance may be generated by applying statistical analysis based on the rate of return (for example) of each account in the set of logical-ruleset-based accounts. In one implementation, statistical analysis is performed by determining the average rate of return or mean across accounts in the ruleset-based accounts. The composite return may be the asset-weighted average of the performance of all sets of strategy-based designated value accounts forming a composite.

The composite performance thus indicates performance of the composite across all accounts in the set of ruleset-based accounts. This composite performance may be output for display, for re-adjusting the accounts to impact performance or may be the basis for receiving new accounts into the ruleset-based accounts.

Figure 2:
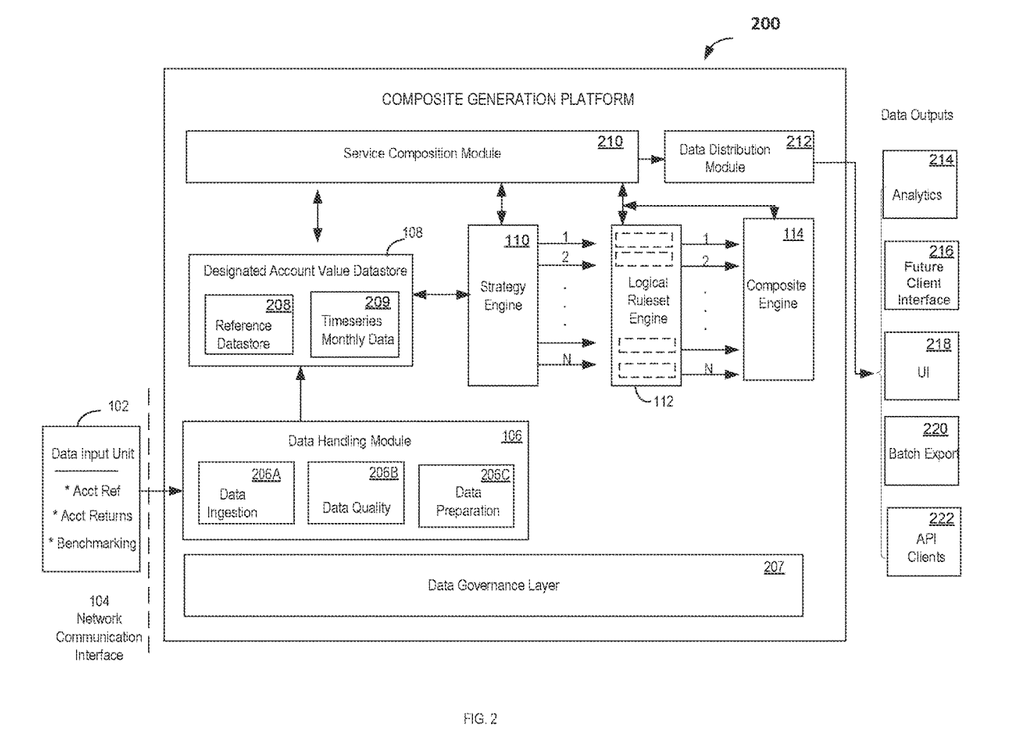
FIG. 2 illustrates a composite generation platform to generate performance composites according to an example of the present disclosure.

FIG. 2 illustrates a composite generation platform 200 to generate composite performance according to an example of the present disclosure.

In FIG. 2, composite generation platform 200 is similar to composite generation platform 100 of FIG. 1 except that the composite generation platform 200 includes a data governance layer 207, a service composition module 210 and a data distribution module 212. In this example, the data input unit 102 receives three data sets namely: (1) account reference data that has account attributes, strategy, etc. (2) account returns and market value data i.e., the performance of applicable accounts; and (3) benchmark data that the applicable composite is following.

The data handling module 106 uses a data ingestion module 206A to ingest the data, after which a data quality 206B initiates standard processing to ensure the data conforms to certain standards (e.g., removal or correction of blank data fields). A data preparation 206C of the data handling module 106 then finds an optimum mix of account reference data, return data and benchmark data that can blend with existing reference data in the reference datastore 208 which may include account information and other rules and models for timeseries monthly data 209.

Contemporaneously, the data governance layer 207 maintains data traceability, and traces data elements from start to finish until the data persists in the designated account value datastore 108. The data governance layer 207 tracks data lineage (a data lineage process) i.e. what type of transformation data has gone through, what was modified, and entities with access to the data to comply with governmental regulations.

The designated account value data store 108 interacts with the strategy engine 110 as previously described and is also in communication with the service composition module 210. The service composition module 210 is an orchestrator that interacts with each block and directs components to ensure that such components can connect with each other. The data distribution module 212 distributes the performance composite information and calculated returns for analysis by analytics 214, and a future client interface 216. Analytics 214 provides a portfolio manager with insights into performance composites. The portfolio manager may adjust and readjust strategy decisions based on such insights to impact the future performance of the strategy-based value accounts. A future client may receive composite performance data to base investment decisions on the performance data.

The data distribution module 212 further distributes composite performance data via UI (User Interface) 218 to view, create and maintain the logical rulesets, batch export 220 to export information in batches and API calls to API clients 222.

Figure 3:
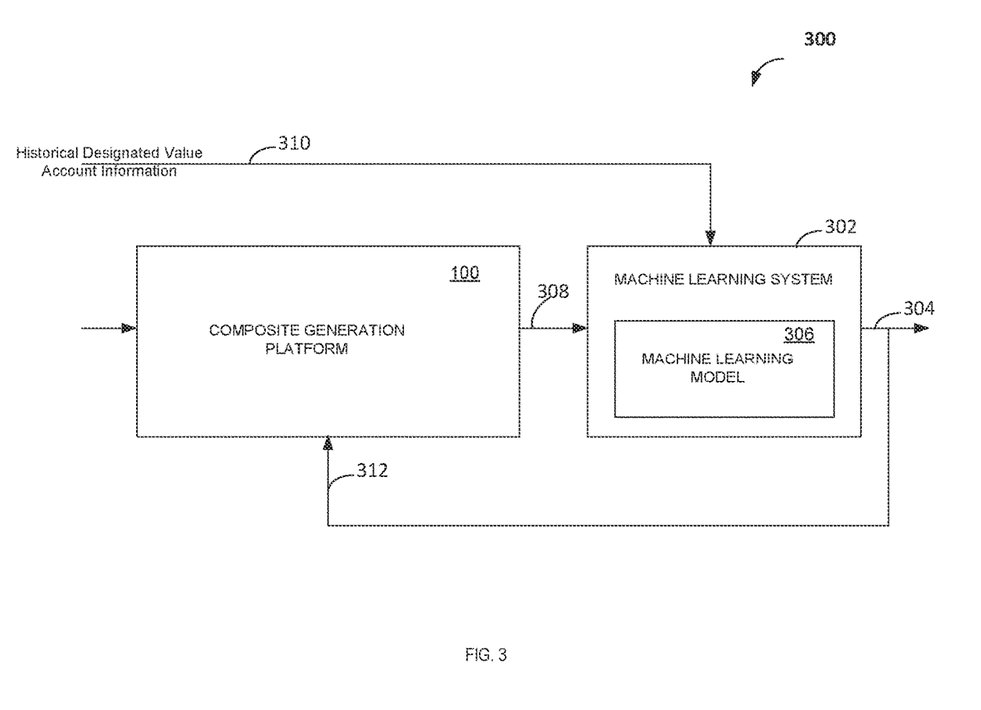
FIG. 3 illustrates a machine-learning composite generation platform to explain composite members and composite rules, and to predict composite outliers according to an example of the present disclosure.

FIG. 3 illustrates a machine-learning composite generation platform 300 to explain composite rules and outliers according to an example of the present disclosure.

In FIG. 3, machine-learning composite generation platform 300 includes the composite generation platform 100 of FIG. 1 and a machine learning system 302. Composite performance information generated by the composite generation platform 100 is fed into the machine learning system 302 via output 308. In one implementation, the machine learning system 302 uses the composite performance information in conjunction with historical designated-value account information from input 310 to explain composite rules and memberships. In another alternate implementation, the machine learning system 302 uses the composite performance information in conjunction with historical designated-value account information from input 310 forecasting, e.g., application of composite rules to memberships.

When the composite performance information is received, the machine learning system 302 extracts composite membership information from the data. Composite membership information indicates which the designated-value accounts that are included or excluded from a composite. Excluded designated-value accounts draw an exception and are excluded by the logical rulesets.

The machine learning system 302 also extracts composite membership information from historical designated-value account information, e.g., time series data for use as training data for a machine learning model 306. The machine learning system 302 then uses the historical composite membership information to explain composite rules (i.e., which designated-value accounts are excluded).

For some examples, the machine learning system 302 provide rules interpretation, automated commentary and exception management. Rules interpretation examines historical market cycles in comparison to account data points or composite rules, and then suggests rule changes or additions/removals. Automated commentary may examine account level holdings vs. a reference account and provide the automated commentary for why account returns may differ. For example, automated commentary may be that Account A is underweight by a certain asset category by 5% compared to reference account B. The composite system workflow for releasing composite returns may also contain a machine learning aspect that notices patterns in exception management and dispositions those exceptions. For instance, if the same Account A is month-after-month underperforming reference account B for the same reason (underweight by 5%), then the exception is automatically dispositioned so that a user does not have to manually dispose.

In one implementation, input 310 receives historical designated-value account information, which may include time series data with composite membership information and composite performance. The information may be used as a training set to train machine learning model 306. The training set may include data patterns and sequences that are known.

The machine learning model 306 is repeatedly evaluated and generated outcomes adjusted based upon the accuracy of the expected output. In one example, the machine learning model 306 may learn through training by comparing outputs to known outcomes. As training progresses, the outputs of the machine learning model 306 may become increasingly accurate. Once training and setup of machine learning model 306 is complete, and evaluations become satisfactory, the machine learning system 302 can render recommendations.

In an implementation, machine learning model 306 may be based on a classification method. The classification method may correspond to one or more of support vector machines (SVM), random forest (RF) and artificial neural networks (ANN), for example. In one example, an RF classification method can be used. The RF classification method is a collection of decision trees that can make generate an output based on historical designated-value account information. That is, each individual decision tree includes branches that classify historical designated-value account information according to their characteristics (e.g., composite strategy, rates of return, etc.). In an example, numerous historical designated-value account data can be processed by the decision tree. Each account data that is processed follows its specific path through the decision tree. Historical designated-value account information data having the same or similar characteristics follow the same path within the classification tree.

Running such data through the decision tree thus leads to a learning phase to identify the specific branches of the tree that can be linked to make future output decisions. Such learning phase may take place based on building numerous decision trees with many branches each, including paths that discriminate among different vulnerability data.

Figure 4:
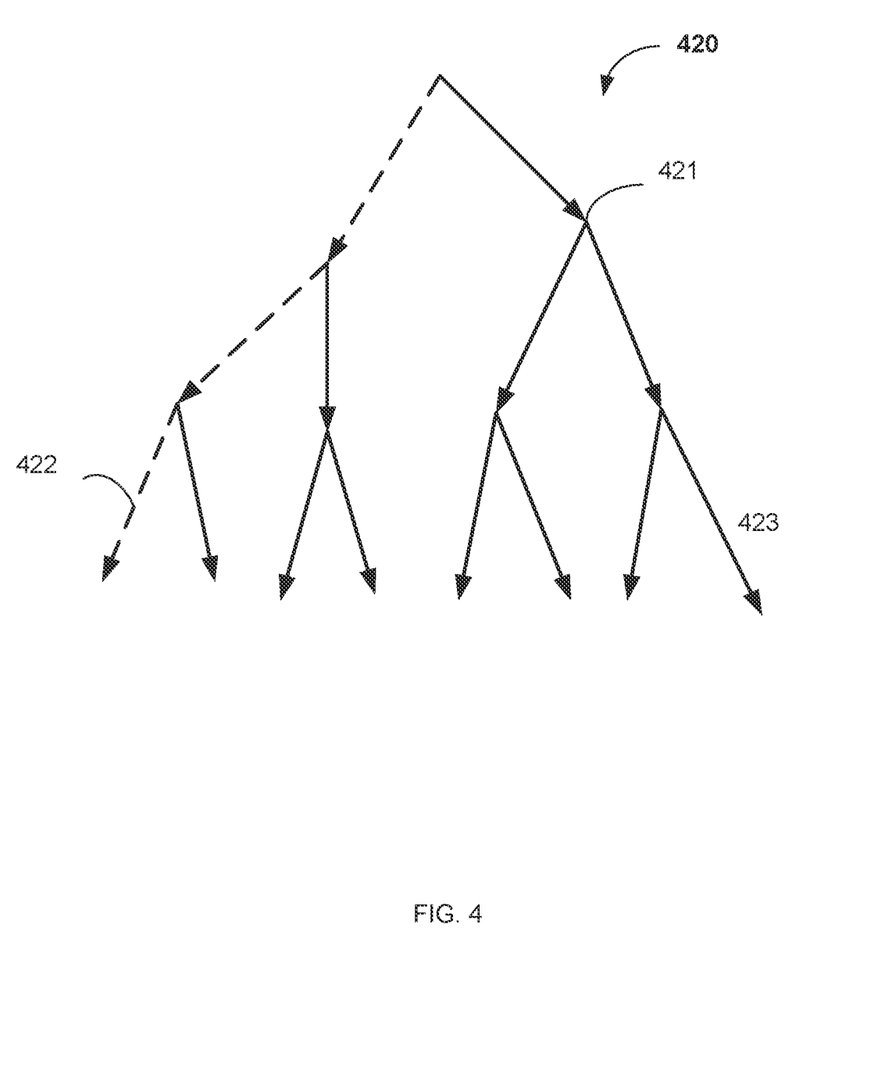
FIG. 4 illustrates a decision tree according to an example of the present disclosure.

FIG. 4 illustrates a decision tree 420 according to an example of the present disclosure. Path 423 is identified during the learning phase as corresponding to an expected output of composite membership or explanation, path 422 is identified during learning as corresponding to another expected output. For example, path 423 may involve an output based on designated-value account information for a composite where certain accounts drew an exception. Data that meets such characteristics proceed along path 423, other data that does not proceeds along path 422.

At each intersection such as 421 a test such as for example "is the output accurate" is made. This is of course a symbolic representation and RF processing of expected outputs can be significantly more complex. In an example, RF processing builds a tree, whereby each branch of the tree represents expected recommendations of similar templates, whereby each branch is associated with an expected recommendation. Classification may increase in precision as additional time series data are processed. This progressive process is referred to as the learning phase, whereby RF classification becomes increasingly more accurate at future output decisions.

Figure 5:
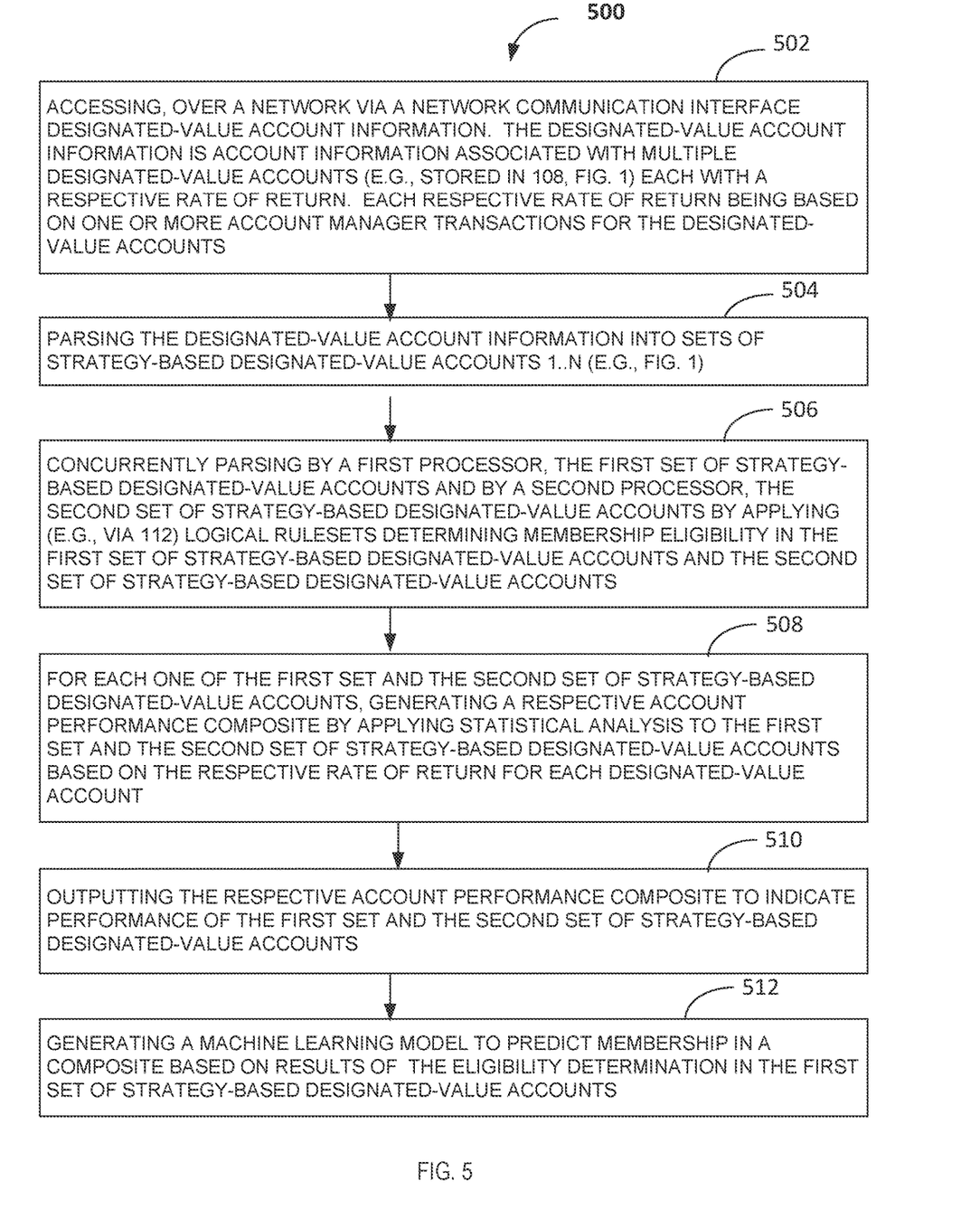
FIG. 5 illustrates a computer-implemented method for generating performance composites according to an example of the present disclosure.

FIG. 5 illustrates a computer-implemented method 500 for generating performance composites according to an example of the present disclosure.

At block 502, method 500 may include accessing, over a network via a network communication interface (e.g., 104, FIG. 1), designated-value account information. The designated-value account information is account information associated with multiple designated-value accounts (e.g., stored in 108, FIG. 1) each with a respective rate of return. Each respective rate of return being based on one or more account manager transactions for the designated-value accounts.

At block 504, method 500 may involve parsing the designated-value account information into sets of strategy-based designated-value accounts 1 ... N (e.g., FIG. 1).

At block 506, method 500 includes concurrently parsing by a first processor, the first set of strategy-based designated-value accounts and by a second processor, the second set of strategy-based designated-value accounts by applying (e.g., via 112) logical rulesets determining membership eligibility in the first set of strategy-based designated-value accounts and the second set of strategy-based designated-value accounts. Eligibility membership may be determined via the logical rulesets.

At block 508, for each one of the first set and the second set of strategy-based designated-value accounts, method 500 may include generating a respective account performance composite by applying statistical analysis to the first set and the second set of strategy-based designated-value accounts based on the respective rate of return for each designated-value account.

At block 510, method 500 may include outputting the respective account performance composite to indicate performance of the first set and the second set of strategy-based designated-value accounts.

At block 512, method 500 may include generating a machine learning model (e.g., 306, FIG. 3) to explain composite rules and generate Audit reports.

Figure 6B:
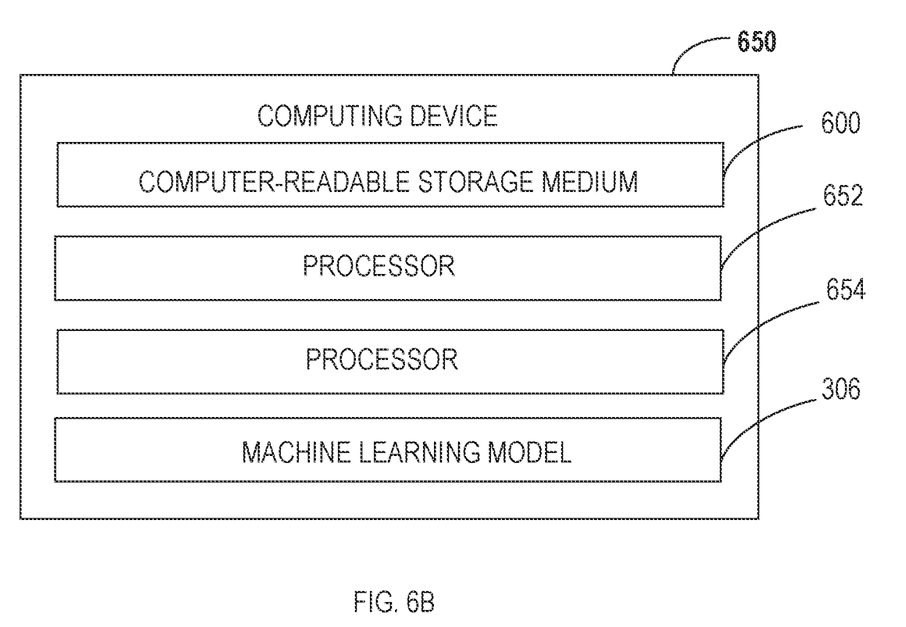
FIG. 6B illustrates a block diagram of a computer system or device according to an example of the present disclosure.

FIGS. 6A and 6B illustrate example instructions stored on a non-transitory computer-readable storage medium 600, which can be used in a computer system or device 650 according to one example of the present disclosure.

As shown in FIG. 6A, the non-transitory computer-readable storage medium 600 includes instruction 602, instruction 604, instruction 606, instruction 608, instruction 610 and instruction 612. Instruction 602 can cause a processor 652 (FIG. 6B) to access, over a network via a network communication interface (e.g., 104, FIG. 1), designated-value account information. Here, the designated-value account information is account information associated with designated-value accounts that have a respective rate of return, where each respective rate of return being based on one or more account manager transactions for the designated-value accounts.

Instruction 604 can cause processor 652 to parse the designated-value account information into sets of strategy-based designated-value accounts including a first set of strategy-based designated-value accounts and a second set of strategy-based designated-value accounts.

Instruction 606 can cause concurrently parsing by processor 652, the first set of strategy-based designated-value accounts and by a processor 654, the second set of strategy-based designated-value accounts by applying a plurality of logical rulesets determining membership eligibility in the first set of strategy-based designated-value accounts and the second set of strategy-based designated-value accounts.

Instruction 608 can cause, for each one of the first set and the second set of strategy-based designated-value accounts, generating a respective account performance composite by applying statistical analysis to the first set and the second set of strategy-based designated-value accounts based on the respective rate of return for each designated-value account.

Instruction 610 can cause outputting, via an API (Application Programming Interface), User Interface or batch processing, the respective account performance composite to indicate performance of the first set and the second set of strategy-based designated-value accounts.

The present disclosure may employ a software stack to enlist the underlying tools, frameworks, and libraries used to build and run example applications of the present disclosure. Such a software stack may include Python, Java, R, React, Databases, Spark, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, Angular JS, and Node.js) stack may be employed. In another example, a LAMP (Linux, Apache, MySQL, and PHP) stack may be utilized.

Any suitable programming language can be used to implement the routines of particular examples including Java, Python, JavaScript, C, C++, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D.

As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

The invention claimed is:

1. A server system for generating performance composites, the server system comprising:
   a network communications interface; and
   a storage medium with instructions executed by a plurality of processors to:
   access, over a network via the network communication interface, designated-value account information, wherein the designated-value account information is account information associated with a plurality of designated-value accounts, each with a respective rate of return, and each respective rate of return being based on one or more account manager transactions for the designated-value accounts;
   parse, via a strategy engine, the designated-value account information into a plurality of sets of strategy-based designated-value accounts including a first set of strategy-based designated-value accounts and a second set of strategy-based designated-value accounts, wherein each set of the plurality of sets is a subset of the designated-value account information;
   concurrently parse by a first processor, via a logical ruleset engine, the first set of strategy-based designated-value accounts and by a second processor, the second set of strategy-based designated-value accounts by applying a plurality of logical rulesets determining membership eligibility in the first set of strategy-based designated-value accounts and the second set of strategy-based designated-value accounts, wherein the parsing by the first processor and the parsing by the second processor are performed in parallel, and wherein the first processor and the second processor utilize a vector-based, multiple-processing model;
   for each one of the first set and the second set of strategy-based designated-value accounts, generate, via a composite engine, a respective account performance composite by applying statistical analysis to the first set and the second set of strategy-based designated-value accounts based on the respective rate of return for each designated-value account; and
   output the respective account performance composite to indicate performance of the first set and the second set of strategy-based designated-value accounts.

2. The server system of claim 1, wherein the storage medium further stores a machine learning model,
   wherein the machine learning model receives the respective account performance composite and historical designated-value account information,
   wherein the machine learning model uses the respective account performance composite and the historical designated-value account information to explain composite rules, identify outliers of each respective account performance composite, and generate audit reports, and
   wherein the composite rules are used in determining a corresponding composite membership for each respective designated-value account.

3. The server system of claim 1, wherein the storage medium further includes instructions executed by the plurality of processors to set a designated or threshold value for the plurality of designated-value accounts.

4. The server system of claim 3, wherein all of the plurality of designated value accounts meet or exceed the designated or threshold value.

5. The server system of claim 1, wherein the storage medium further includes instructions executed by the plurality of processors to distribute the account performance composite via an API (Application Programming Interface).

6. The server system of claim 2, wherein the storage medium further includes instructions executed by the plurality of processors to:
   train the machine learning model, wherein the training includes applying the machine learning model to the historical designated-value account information to generate a training output;
   evaluate the machine learning model by comparing the training output to a known outcome;
   determine an accuracy value of the machine learning model based on the evaluating operation;
   compare the accuracy value of the machine learning model to a predetermined threshold value;
   when the accuracy value is below the predetermined threshold value, adjust the machine learning model; and
   iteratively perform the evaluating, determining, comparing, and adjusting operations until the accuracy of the model exceeds the predetermined threshold value.

7. The server system of claim 2, wherein the storage medium further includes instructions executed by the plurality of processors to:
   compare, via the machine learning model, the designated-value account information with reference account information associated with a reference account; and
   generate, via the machine learning model, automated commentary explaining a reasoning for differences in returns between the plurality of designated-value accounts and the reference account.

8. The server system of claim 2, wherein the storage medium further includes instructions executed by the plurality of processors to:
   compare, via the machine learning model, historical market cycles with data points of a user account; and
   generate, via the machine learning model, suggested changes, additions, or removals to the composite rules based on a result of the comparing operation.

9. The server system of claim 2, wherein the storage medium further includes instructions executed by the plurality of processors to:
   generate, via the machine learning model, a decision tree based on the historical designated-value account information;
   process data from the historical designated-value account information by the decision tree to identify each respective pathway of the decision tree that corresponds to a separate respective account performance composite;
receive user account data; and
process the user account data by the decision tree to identify a corresponding respective account performance composite membership for the user account data.

10. A non-transitory computer-readable storage medium including computer-executable instructions stored thereon which, when executed by a processor, causes the processor to perform the following operations:
access, over a network via a network communication interface, designated-value account information, wherein the designated-value account information is account information associated with a plurality of designated-value accounts that have a respective rate of return, each respective rate of return being based on one or more account manager transactions for the designated-value accounts;
parse, via a strategy engine, the designated-value account information into a plurality of sets of strategy-based designated-value accounts including a first set of strategy-based designated-value accounts and a second set of strategy-based designated-value accounts, wherein each set of the plurality of sets is a subset of the designated-value account information;
concurrently parse by a first processor, via a logical ruleset engine, the first set of strategy-based designated-value accounts and by a second processor, the second set of strategy-based designated-value accounts by applying a plurality of logical rulesets determining membership eligibility in the first set of strategy-based designated-value accounts and the second set of strategy-based designated-value accounts, wherein the parsing by the first processor and the parsing by the second processor are performed in parallel, and wherein the first processor and the second processor utilize a vector-based, multiple-processing model;
for each one of the first set and the second set of strategy-based designated-value accounts, generate, via a composite engine, a respective account performance composite by applying statistical analysis to the first set and the second set of strategy-based designated-value accounts based on the respective rate of return for each designated-value account; and
output, via an API (Application Programming Interface), a User Interface or batch processing, the respective account performance composite to indicate performance of the first set and the second set of strategy-based designated-value accounts.

11. The non-transitory computer-readable storage medium of claim 10, wherein the operations further comprise generating a machine learning model that receives the respective account performance composite and historical designated-value account information,
wherein the machine learning model uses the respective account performance composite and the historical designated-value account information to explain composite rules, identify outliers of each respective account performance composite, and generate audit reports, and
wherein the composite rules are used in determining a corresponding composite membership for each respective designated-value account.

12. The non-transitory computer-readable storage medium of claim 10, wherein the operations further comprise setting a designated or threshold value for the plurality of designated-value accounts.

13. The non-transitory computer-readable storage medium of claim 12, wherein the statistical analysis is performed by determining a mean of the respective rate of return of each designated account value.

14. The non-transitory computer-readable storage medium of claim 10, wherein the operations further comprise distributing the account performance composite via the API (Application Programming Interface).

15. A computer-implemented method for generating performance composites, the computer-implemented method comprising:
accessing, over a network via a network communication interface, designated-value account information, wherein the designated-value account information is account information associated with a plurality of designated-value accounts that have a respective rate of return, each respective rate of return being based on one or more account manager transactions for the designated-value accounts;
parsing, via a strategy engine, the designated-value account information into a plurality of sets of strategy-based designated-value accounts including a first set of strategy-based designated-value accounts and a second set of strategy-based designated-value accounts, wherein each set of the plurality of sets is a subset of the designated-value account information;
concurrently parsing by a first processor, via a logical ruleset engine, the first set of strategy-based designated-value accounts and by a second processor, the second set of strategy-based designated-value accounts by applying a plurality of logical rulesets determining membership eligibility in the first set of strategy-based designated-value accounts and the second set of strategy-based designated-value accounts, wherein the parsing by the first processor and the parsing by the second processor are performed in parallel, and wherein the first processor and the second processor utilize a vector-based, multiple-processing model;
for each one of the first set and the second set of strategy-based designated-value accounts, generating, via a composite engine, a respective account performance composite by applying statistical analysis to the first set and the second set of strategy-based designated-value accounts based on the respective rate of return for each designated-value account; and
outputting the respective account performance composite to indicate performance of the first set and the second set of strategy-based designated-value accounts.

16. The computer-implemented method of claim 15, further comprising generating a machine learning model that receives the respective account performance composite and historical designated-value account information,
wherein the machine learning model uses the respective account performance composite and the historical designated-value account information to explain composite rules, identify outliers of each respective account performance composite, and generate audit reports, and
wherein the composite rules are used in determining a corresponding composite membership for each respective designated-value account.

17. The computer-implemented method of claim 15, further comprising setting a designated or threshold value for the plurality of designated-value accounts.

18. The computer-implemented method of claim 17, wherein all of the plurality of designated value accounts meet or exceed the designated or threshold value.

19. The computer-implemented method of claim 15, further comprising distributing the composite performance via an API (Application Programming Interface).

* * * * *